United States Patent [19]

Specogna et al.

[11] Patent Number: 5,472,089
[45] Date of Patent: Dec. 5, 1995

[54] LIGHT-TIGHT AND PHYSICALLY PROTECTED PACKAGING FOR A ROLL OF PHOTOSENSITIVE WEB

[75] Inventors: Valter Specogna; Michael L. Koelsch; Kathleen L. Myers, all of Rochester, N.Y.

[73] Assignee: Eastman Kodak Company, Rochester, N.Y.

[21] Appl. No.: 237,488

[22] Filed: May 3, 1994

[51] Int. Cl.$^6$ ................................................. B65D 85/67
[52] U.S. Cl. ............................................ 206/413; 206/410
[58] Field of Search ................................ 206/316.1, 410, 206/412–416, 455, 389

[56] References Cited

U.S. PATENT DOCUMENTS

| | | |
|---|---|---|
| 3,731,792 | 5/1973 | Rolston . |
| 3,734,273 | 5/1973 | Watanabe . |
| 4,114,756 | 9/1978 | Dacey et al. . |
| 4,148,395 | 4/1979 | Sysracuse et al. . |
| 4,455,076 | 6/1984 | Birkeland . |
| 4,505,387 | 3/1985 | Seto . |
| 4,612,232 | 9/1986 | Obara et al. . |
| 4,730,778 | 3/1988 | Akao et al. . |
| 4,733,777 | 3/1988 | VanGeyte et al. . |
| 4,911,299 | 3/1990 | Peeters . |
| 4,936,459 | 6/1990 | Mushinski et al. . |
| 5,049,928 | 9/1991 | Tirone .................... 206/414 X |
| 5,090,566 | 2/1992 | Yount . |
| 5,114,012 | 5/1992 | Mushinski et al. . |
| 5,133,171 | 7/1992 | Chase et al. . |
| 5,145,065 | 9/1992 | Mizutani .................. 206/389 |
| 5,145,066 | 9/1992 | Clark et al. . |
| 5,167,322 | 12/1992 | Lemaire . |
| 5,222,601 | 6/1993 | Takahashi et al. . |
| 5,255,040 | 10/1993 | Pagano . |
| 5,264,886 | 11/1993 | Byrd . |
| 5,353,933 | 10/1994 | Takahashi et al. ........ 206/413 X |

FOREIGN PATENT DOCUMENTS 0181417 11/1984 European Pat. Off. .

OTHER PUBLICATIONS

Research Disclosure, #22932, May 1983, vol. 229, p. 190.

*Primary Examiner*—Bryon P. Gehman
*Attorney, Agent, or Firm*—Charles E. Snee, III

[57] ABSTRACT

Light-tight packaging (10) for photosensitive web roll (R) has a flexible material portion (24) detachably attached to a leading end portion (18) of the roll (R) that over wraps the outermost first convolution (20) of the roll (R). Opaque end members (22) are attached to the core (21) of the roll (R). First, second and third stretchable segments (28,30,32) of the flexible material portion (24) having widths wider than or equal to the length of the roll overlap the outermost first convolution (20) of the roll (R) to form successive outermost convolutions comprising the respective stretchable segment. Alternate stretchable segments overhang the end peripheral edges (16) of the roll (R) and overlap and compressively seal the end members (22) to the annular faces (12,14) of the roll (R). Folded overlapped portions (36,40) on the annular faces (12,14) form a labyrinth-type seal (42) on the annular faces (12,14) which cooperate with the compressively sealed opaque end members (28) to resist the ingress of light to the roll (R). In an alternative embodiment, a cushioning layer (112) is provided on anyone of the sequentially stretchable segments for absorbing shock and abrasions during web roll handling.

24 Claims, 5 Drawing Sheets

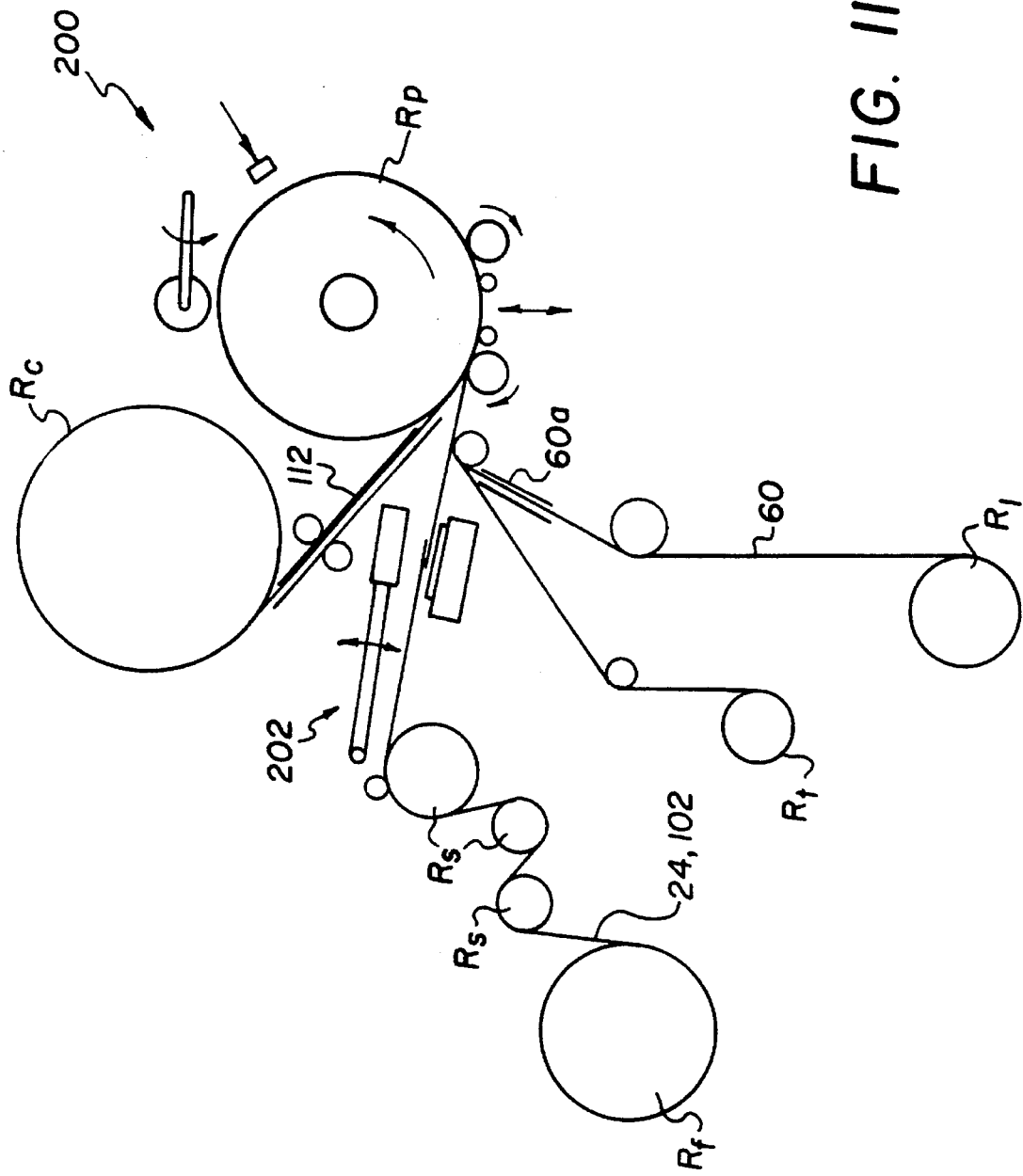

LIGHT-TIGHT AND PHYSICALLY PROTECTED PACKAGING FOR A ROLL OF PHOTOSENSITIVE WEB

FIELD OF THE INVENTION

The invention relates to packaging of web or other object. More particularly, the invention concerns light-tight and physically protected packaging for a roll of photosensitive web insertable in a cassette or similar device.

BACKGROUND OF THE INVENTION

As disclosed for example in the following patents, packaging for photosensitive material are well known, and specific embodiments-thereof have been provided for solving various material packaging problems, or for meeting various materials packaging objectives.

In U.S. Pat. No. 5,133,171 end disks or flanges are disclosed having dimensions larger than the dimensions of the roll. These large flanges, while satisfactory for solving the problem addressed in the patent, could complicate dispensing from some cassettes and prevent the film from being rewound back into the cassettes.

Other light-tight packaging, such as those described in Research Disclosure 22932, U.S. Pat. Nos. 4,911,299, 4,505, 387, 4,148,395, and 4,733,777 require components to be torn to access product in the packaging, thereby producing dust and dirt. Moreover, these prior art packages are also difficult to manufacture because of the number of components and complicated sealing operations.

There also exist several packages, such those described in, for instance, U.S. Pat. Nos. 0,191,417, 4,911,299, and 5,222, 601, that disclose aspiral wrapping technique to cover the ends of the roll. The resultant packaging adds multiple thicknesses of material to the ends of the roll and to the roll core thereby preventing its use in many types of processing equipment. Furthermore, these packages have the additional shortcoming of requiring tearing of components to access the contents, as well as complicated manufacturability.

Despite the various improvements represented by the above examples; an almost universal objective to be accomplished is to completely block the ingress of light to the physically protected roll while not making the roll incompatible with various types of processing equipment.

SUMMARY OF THE INVENTION

It is therefore an object of the invention to provide packaging for photosensitive web roll that resists ingress of light.

Another object of the invention is to provide packaging for photosensitive web roll that protects the web roll from shock and abrasion during handling.

Still another object of the invention is to provide packaging that forms a labyrinth-type seal on opposing annular faces of the roll as a light lock means.

Yet another object of the invention is to provide a cost effective and easily manufacturable light-tight protected packaging for photosensitive web roll.

Accordingly, for accomplishing one or more of the above objects of the invention, there is provided, in one aspect of the invention, light-tight packaging for a roll of photosensitive web wound on a core, the roll having opposing annular faces and end peripheral edges surrounding the opposing annular faces, and a leading end portion extending from an outermost first convolution of the roll, the packaging comprising:

an opaque end member attachable to the core of the roll, the opaque end members being configured to cover a portion of the respective annular face;

an opaque flexible material portion detachably attached to the leading end portion of the roll, the flexible material portion having sequential first, second and third stretchable segments, the first and third stretchable segments each having a similar width initially somewhat wider than the width of the roll, and the second stretchable segment having a width equal to or less than the width of the roll;

the first stretchable segment of the flexible material portion being stretchably wrapped around the outermost first convolution of the roll for at least one convolution to form an outermost second convolution, the first stretchable segment being wrapped to overhang the end peripheral edges and overlap a portion of the annular face of the roll thereby forming a first overlap portion on the annular face;

the second stretchable segment being wrapped around at least a portion of the outermost second convolution; and, the third stretchable segment being wrapped around the outermost second/convolution to form an outermost third convolution, the third stretchable segment being wrapped to overhang the end peripheral edges and overlay the first overlap portion to form a second overlap portion, the third stretchable segment further overlapping continuously at least a portion of the opaque end members, each of the opaque end members being attached to opposing ends of the core of the roll, the overlap of the third stretchable segment about each of the opaque end members being sufficient to compressively seal the opaque end members to the respective annular face of the roll; and wherein the first and second overlap segments cooperate with each of the compressively sealed opaque end members to form a labyrinth-type seal on the annular faces for resisting the ingress of light to the roll.

In another aspect of the invention, there is provided a light-tight packaging for a roll of photosensitive web wound on a core, the core having opposing end openings surrounding an interior wall, the roll having opposing annular faces and end peripheral edges surrounding the opposing annular faces, and a leading end portion extending from an outermost first convolution of the roll, the packaging comprising:

an opaque end member attachable to each of the opposing ends of the core of the roll, the opaque end members being configured to cover a portion of the respective annular face;

an opaque flexible material portion detachably attached to the leading end portion of the roll, the flexible material portion having sequential first, second, and third stretchable segments, the first and third stretchable segments having a similar width initially somewhat wider than the width of the roll, and the second stretchable segment having a width equal to or less than the width of the roll;

the first stretchable segment of the flexible material portion being stretchably wrapped around the outermost first convolution of the roll for at least one convolution to form an outermost second convolution, the first stretchable segment being wrapped to overhang the end peripheral edges and overlap a portion of the annular face of the roll thereby forming a first overlap portion on the annular face;

the second stretchable segment being wrapped around at least a portion of the outermost second convolution;

the third stretchable segment being wrapped around the outermost second convolution for at least two convolutions to form an outermost third and fourth convolution, the third stretchable segment being wrapped to overhang the end peripheral edges and overlay the end member attached to the core to form a second overlap portion, the third stretchable segment further overlapping continuously at least a portion of each of the respective opaque end members, each of the opaque members being attached to a respective opposing annular face of the roll, the overlap of the third stretchable segment about each of the opaque end members being sufficient to compressively seal the opaque end members to the respective annular face of the roll;

wherein the first and second overlap portions cooperate with each of the compressively sealed opaque end members to form a labyrinth-type seal on each the annular face for resisting the ingress of light to the roll; and, wherein a cushioning layer is sandwiched between the third and fourth convolutions for protecting the roll from shock and abrasion.

In yet another aspect of the present invention, an article of manufacture comprises a web roll and a light-tight and physically protected packaging having a labyrinth-type seal formed on the annular faces of the roll for preventing the ingress of light thereto, as previously described, enclosing the web roll.

Accordingly, it has been found by the applicants that dimensionally sized opaque end members or flanges on the annular faces of the roll and overlapping stretchable opaque material around the circumference of the roll and end peripheral edges for several convolutions, provide significantly improved light-tight properties. Specifically, opaque end members having a radius somewhat less than the radius of the core of the roll are preferred. Further, by adding a cushioning layer to one of several stretchable segments, enhanced physical protection is provided for the roll against shock and abrasion during handling.

Advantageous effects of the improved lightight packaging of the present invention include: it is easily manufacturable and cost effective; it provides a simple mechanical lightlock that protects the roll from exposure to light while loading the roll into cooperating equipment under room light conditions; and, it provides protection of the roll from shock and abrasion.

BRIEF DESCRIPTION OF THE DRAWINGS

The foregoing as well as other objects, features and advantages of this invention will become more apparent from the appended Figures, wherein like reference numerals denote like elements, and wherein.

DETAILED DESCRIPTION OF THE INVENTION

Figure 1:
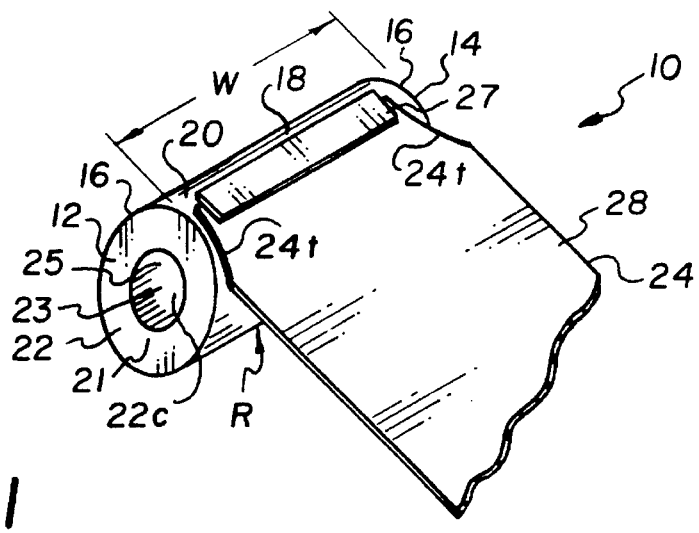
FIG. 1 is a perspective view of the packaging showing the flexible material attached to the leading end portion of the roll.

While certain parts of packaging for web rolls are well known, the following description is directed in particular to those elements forming, cooperating directly with, or relating to, this invention. Elements not specifically shown or described herein are selectable from those known in the relevant art.

Turning now to the drawings, and more particularly to FIGS. 1–6, light-tight packaging 10 of a roll of photosensitive web of the invention is illustrated. Shown clearly in FIG. 2, the photosensitive web roll (R), such as sensitized photographic paper or film material, comprises opposing annular faces 12,14 and end peripheral edges 16 surrounding the opposing annular faces 12,14. According to FIG. 1, a leading end portion 18 extends from an outermost first convolution 20 of the roll (R) for cooperating with associated equipment (not shown), such as a cassette. Typically the roll (R) has a core 21 having a length w, opposed core openings 23 and an interior wall 25 extending between the core openings 23.

Figure 8:
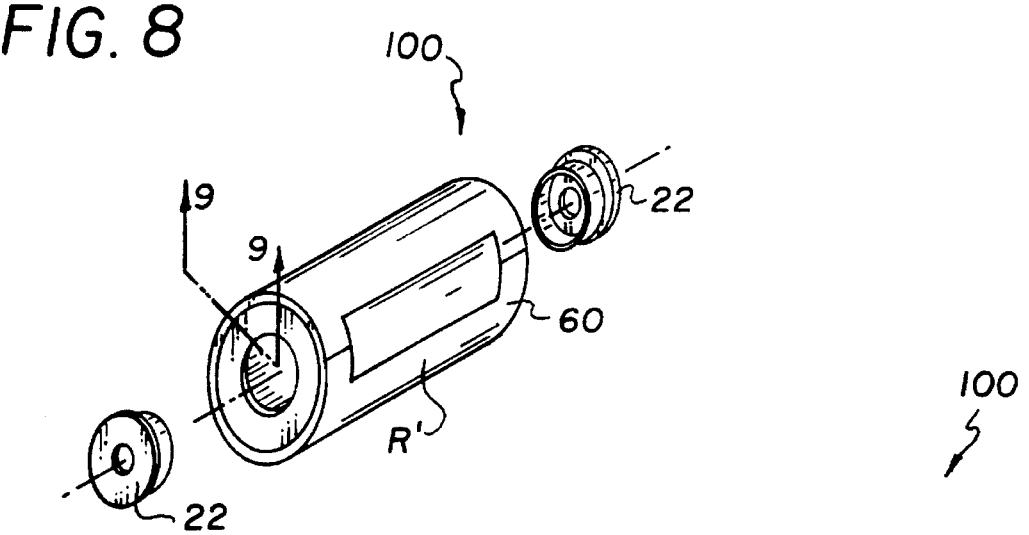
FIG. 8 is a perspective view of fully assembled packaging having optional core plugs exploded away from the core of the roll.

Broadly defined, the light-tight packaging 10 of the invention comprises a pair of opaque end members 22 attachable to the core 21 of roll (R), and several convolutions of a flexible material portion 24 wrapped around the outermost first convolution 20 of the roll (R), as described in details below. It is to be appreciated that rolls (R), having various width cores 21, may be packaged in substantially the same way, although a spiral wrapping method (such as the type disclosed in U.S. Pat. No. 5,203,139) of the flexible material portion 24 is deemed more efficacious for larger width cores 21, i.e., cores 21 with a width greater than about 12 inches. In the preferred embodiment, each of the opaque end members 22 is configured to cover a portion of the respective annular face 12,14. The opaque end members 22, preferably similar, can be applied either prior to wrapping the flexible material portion 24 around the outermost first convolution 20 or during the wrapping of the flexible material portion 24. The opaque end members 22 are preferably substantially disk-like shaped, although other geometric shapes, such as any polygon, would suffice. Further, opaque end member 22 may have a central opening 22c which substantially corresponds to the core opening 23 for enabling easy access to the interior wall 25 of the core 21. The opaque end members 22 are fastened to the interior wall 25 of the core 21 so as to provide a lighttight bond for the roll (R). Preferably, the opaque end members 22 are heat sealed to the interior wall 25 of the core 21. In this manner, there is no appreciable decrease in the inside diameter of the core 21 nor appreciable increase of the width of the roll (R). Alternative methods of adhering the opaque end members 22 to the core 21 include: tape, cold glue, hot melt, pressure sensitive adhesive, and staples. Optionally, core plugs 26 may also be inserted into the core opening 23 for imparting rigidity to the roll (R), as shown in FIG. 8.

Figure 3:
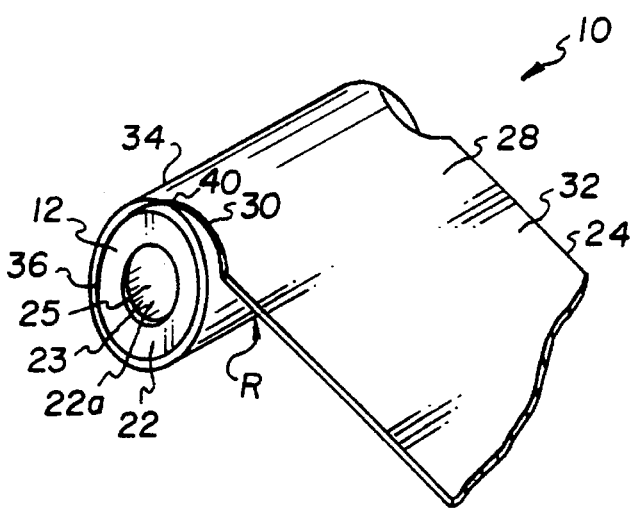
FIG. 3 is a perspective view of the packaging showing the wrapped second stretchable segment in the outermost second convolution.

Referring to FIG. 1, the opaque flexible material portion 24 is shown detachably attached, via tape strip 27 or comparable attachment means, to the leading end portion 18 of the roll (R). To initiate smooth wrapping, flexible material portion 24 has a tapered portion 24t having a width preferable somewhat less than the length w of the roll (R). Tapered portion 24t, attached to the leading end portion 18 of the roll (R), enables easy wrap initiation and promotes uniform wrapability of successive segments (discussed below) of flexible material portion 24. Moreover, flexible material portion 24 may include any number of sequential stretchable segments (best seen in FIG. 5B): however, in this embodiment, the flexible material portion 24 comprises first, second and third stretchable segments 28,30,32 (FIGS. 3 and 5). First and third stretchable segments 28,32 each has a similar length w initially somewhat wider than the width $w_2$ of the roll (R) for reasons described fully below. Further, the second stretchable segment 30 has a width $w_3$ equal to or less than the length w of the roll (R). Stretching of the flexible material portion 24 is accomplished preferably manually, but a suitable apparatus capable of evenly extending an end portion and then relaxing the material 24 to achieve the desired width can also be used, as described in details below. The preferred flexible material portion 24 is a 0.002 inch thick black opaque material, sold by the name Mobil "K"®, and manufactured by the Mobil Chemical Co., Macedon, N.Y. Alternative materials which can be used in this embodiment include a 0.003 inch black opaque stretch wrap material; a 0.002 inch or 0.003 inch black shrink wrap material; or any stretchable polyolefin, such as polyethylene film material.

Figure 2:
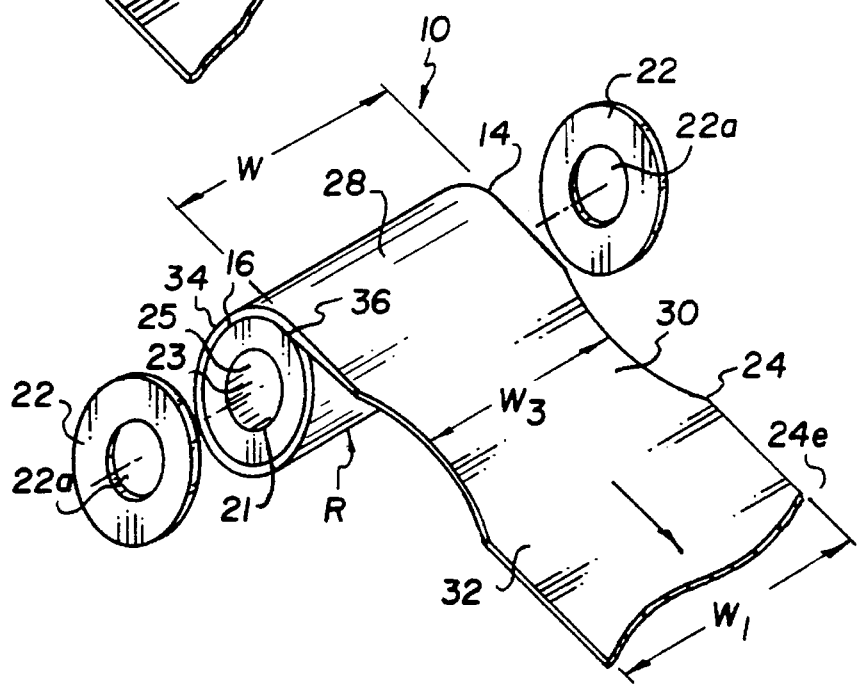
FIG. 2 is a perspective view of the partially assembled packaging, with end members exploded away.

FIG. 2 depicts the first stretchable segment 28 of the flexible material portion 24 stretchably wrapped around the outermost first convolution 20 (FIG. 1) of the roll (R). The first stretchable segment 28 is wrapped around the outermost first convolution 20 of the roll (R) for at least one convolution to form an outermost second convolution 34 comprising the first stretchable segment 28. Since the width $w_1$, of the first stretchable segment 28 is wider than the length w of the roll (R), the first stretchable segment 28 can be made to overhang the end peripheral edges 16 and fold snugly into and overlap a portion of the respective annular face 12,14 of the roll (R). This is achieved by applying a tensile force somewhat evenly along a traverse edge 24e of the flexible material portion 24. This force causes the first stretchable segment 28 overhanging the end peripheral edges 16 to fold snugly into the respective annular face 12,14 of the roll (R) thereby forming a first overlap portion 36 (FIG. 2) on the annular faces 12,14.

As depicted in FIG. 3, the second stretchable segment 30 is wrapped around at least a portion of the outermost second convolution 34. Since the second stretchable segment 30, as described above, has a width $w_3$ equal to or less than the length w of the roll (R), the second stretchable segment 30 does not generally overhang the end peripheral edges 16 of the roll (R) and cannot overlap the annular faces 12,14 of the roll (R).

Figure 4:
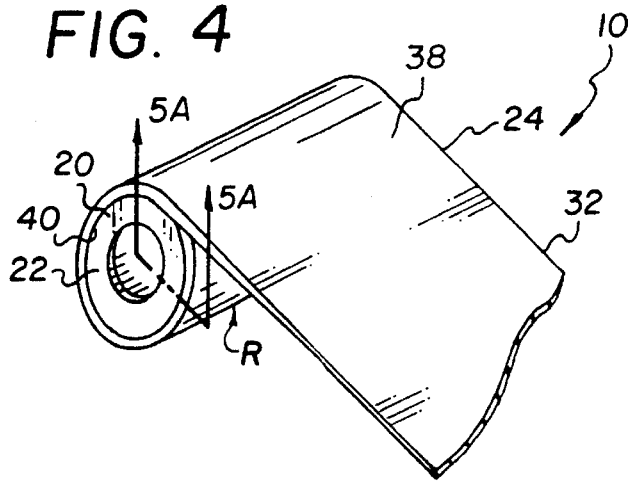
FIG. 4 is a perspective view of the partially assembled packaging showing the wrapped third stretchable segment in the outermost second convolution.

As shown in FIG. 4, the third stretchable segment 32 is wrapped around the outermost second convolution 34 (FIG. 3) to form an outermost third convolution 38 comprising the third stretchable segment 32. The third stretchable segment 32 is wrapped to overhang the end peripheral edges 16 and fold snugly into and overlay the respective opaque end member 22 to form a second overlap portion 40. Further, as depicted in FIG. 4, the third stretchable segment 32 overlaps continuously at least a portion of the respective opaque end members 22. Moreover, the overlap of the third stretchable segment 32 about the respective opaque end members 22 is sufficient to compressively seal the opaque end member 22 to the respective annular face 12,14 of the roll (R).

Figure 5A:
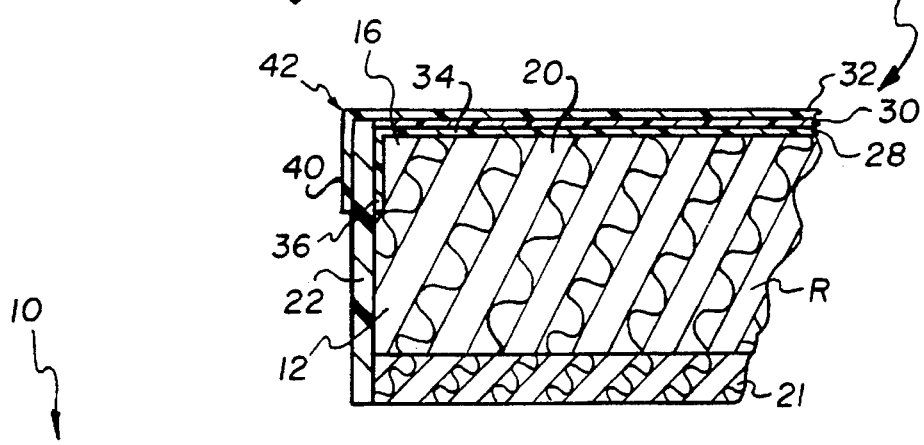
FIG. 5a is a section view along line 5a—5a of FIG. 4.
Figure 5B:
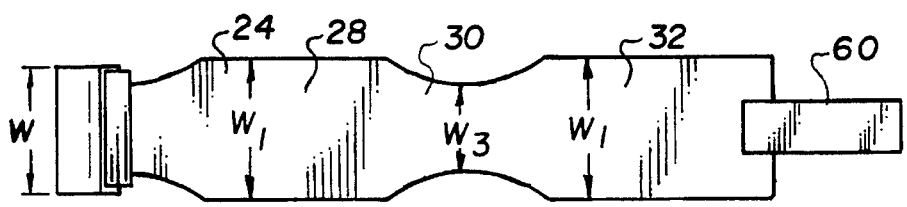
FIG. 5b is a top plan view of the packaging showing the unwrapped and fully extended sequential stretchable segments attached to the roll.

In this embodiment, according to the cross sectional view of FIG. 5A, the first and second overlap portions 36,40 of the flexible material portion 24 cooperate with the respective compressively sealed opaque end member 22 to form a labyrinth-type seal 42, i.e., a substantially non contacting seal, on the respective annular face 12,14 for resisting the ingress of light to the roll (R). The inventors test indicate that the labyrinth-type seal 42 provides superior light protection particularly during day light loading of the photosensitive product in cooperating equipment, such a cassette for a photoprocessor. In the preferred embodiment, the overlap portions 36,40 (which are folded snugly into the end members 22) comprising the labyrinth-type seal 42 may extend across its respective end peripheral edge 16 of the roll (R) by about 0.250 inch (0.625 cm) to about 1.00 inch (2.54 cm) for effective sealing.

FIGS. 6–10 illustrate another aspect of the invention. In this embodiment, packaging 100 comprises a flexible material portion 102 having an initial tapered portion (not shown but similar to that depicted in FIG. 1) affixed to the leading end portion of the roll for initiating the wrapping, and sequential first, second, and third stretchable segments 104, 106,108 (shown clearly in FIGS. 9 and 10). First and third stretchable segments 104,108 each has a similar width $w_1$ initially somewhat wider than the width length w of the roll (R') for the reasons indicated above. The second stretchable segment 106 has a width $w_3$ equal to or less than the length w of the roll (R). Moreover, in this embodiment a cushioning material layer 112, described fully below, is arranged atop the third convolution formed by the third stretchable segment 108 and overhangs the end peripheral edges 118. In the preferred embodiment, the cushioning layer 112 comprises a plurality of cushioning portions arranged preferably along periphery edges of the third outermost convolutions. Another convolution formed by the third stretchable segment 108 is overwrapped over the cushioning layer thereby sandwiching the cushioning material layer 112 between the third and fourth convolutions Cushioning material layer 112 provides physical protection of the roll (R') against shock and abrasion. The preferred cushioning material is polyethylene foam. Other cushioning materials known to the inventors that could be used with similar success include polyurethane foam, bubble wrap, recycled tire material, cloth wool, paper, corrugated board, or woven straw. In this embodiment, the polyethylene foam has a thickness in the range of about 0.125 inches (0.318 cm) to about 0.250 inches (0.635 cm). Those skilled in the art will appreciate that a cushioning layer also be inserted between any successive convolutions or part thereof, or may be wrapped around the final convolution of the assembled packaging and then sealed so as to provide protection for the product enclosed therein.

Figure 6:
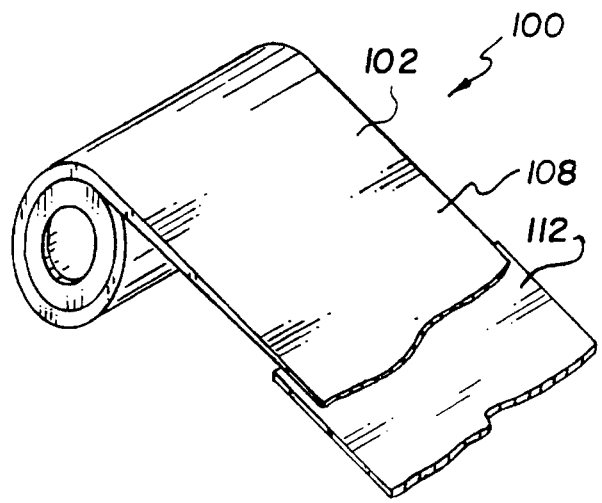
FIG. 6 is a perspective view of an alternative embodiment showing a partially assembled package having a protective cushioning layer.
Figure 7:
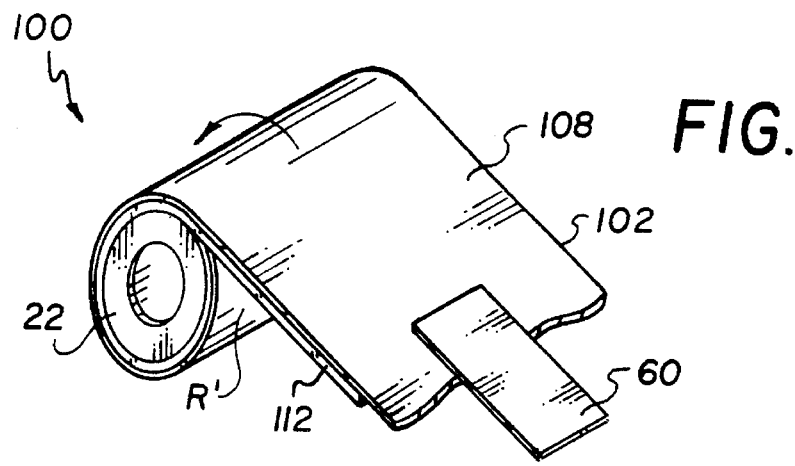
FIG. 7 is the view of FIG. 6 showing partially assembled packaging having the cushioning layer partially sandwiched between successive convolutions.

Furthermore, light-tight indicator means, preferably an adhesive label strip 60, may be affixed to an outermost convolution to signal the user that the roll (R) is protected against light ingress beyond the strip 60. Adhesive label strip 60 may also be used to identify the product and to seal closed the packaging 10 if no additional layers are required beyond the label strip 60. An extended portion 60g of adhesive label strip 60 is easily graspable for accessing packaging 10 when it is desired to use the roll (R). FIGS. 6 and 7 show the cushioning layer 112 positioned for sandwiching between the third and fourth convolutions formed by the third stretchable segments 108. According to the invention, cushioning layer 112 is preferably simply mechanically trapped between sequential overwrap segments 108 of flexible material portion 102. However, those skilled in the art will appreciate that cushioning layer 112 may be adhered (for instance glued or taped) to any one of the stretchable segments of the packaging 100 or be made a part of one of the segments.

Figure 9:
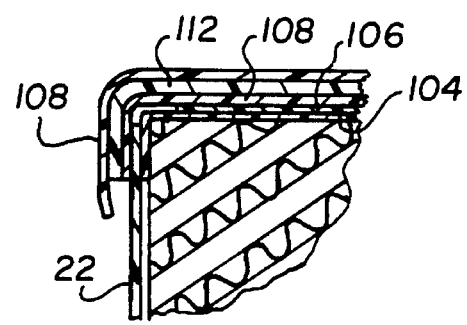
FIG. 9 is a sectional view along the line 9—9 of FIG. 8.
Figure 10:
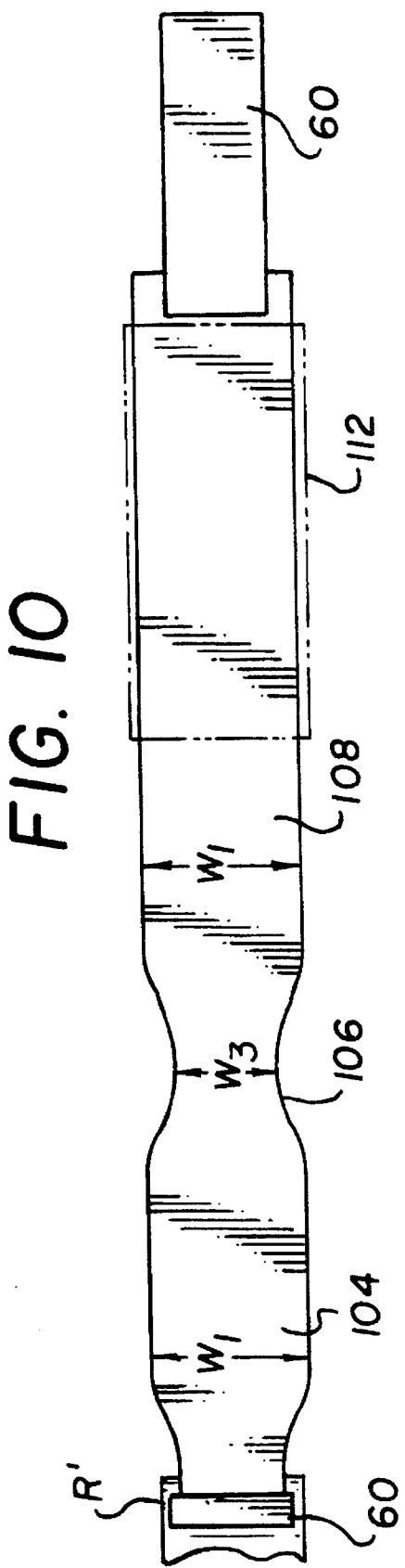
FIG. 10 is a top plan view of the alternative embodiment showing several sequential segments of the flexible material portion fully extended from the outermost first convolution of the roll; and, FIG. 11 is a schematic view of a spiral wrapping apparatus.

As shown in the cross sectional view of FIG. 9, the first stretchable segment 104 of the flexible material portion 102 is stretchably wrapped around the outermost first convolution of the roll (R') for at least one convolution to form an outermost second convolution comprising the first stretchable segment 104. The first stretchable segment 104, being wider than the width of the roll (R'), is wrapped so as to overhang the end peripheral edges 118 of the roll (R') and fold snugly into and overlap the respective annular face 12,14 to form a first overlap portion 119 on the respective annular face 12,14.

Further, the second stretchable segment 106 is wrapped around at least a portion of the outermost second convolution comprising the first stretchable segment 104, as described above.

According to FIG. 6, the third stretchable segment 108 is wrapped around the first stretchable segment 104 in the outermost second convolution to form an outermost third convolution. The outermost third convolution therefore comprises third stretchable segment 108. As indicated above, the third stretchable segment 108 is wrapped to overhang the end peripheral edges 118 and overlay the first overlap portion 119 to form a second overlap portion 121 on each annular face 12,14. Moreover, because the third stretchable segment 108 is wider than the width of the roll (R'), it is wrapped about the outermost convolution so as to overlap continuously at least a portion of the respective opaque end members 22. As indicated, an opaque members 22 is attached to the core of the roll (R') so that the overlap of the third stretchable segment 108 is sufficient to compressively seal the opaque end members 22 to the respective annular face 12,14 of the roll (R').

In this embodiment, the third stretchable segments 108 is wrapped around the roll (R') for at least two convolutions to form a third and fourth outermost convolution. The first overwrap of the third stretchable segment 108 overhangs the end peripheral edges 118 and continuously overlay and contact at least a portion of the end member 22 to form a second overlap portion 121 on the respective annular face 12,14. In this embodiment, labyrinth-type seal 124 is formed by the first and second overlap portions 119,121 which prevent the ingress of light to the roll (R'). In FIG. 7, the third stretchable segment 110 is wrapped around the outermost third convolution to form an outermost fourth convolution comprising the third stretchable segment 110. Further in this embodiment, the cushioning material layer 112 is sandwiched between the third and fourth convolutions for providing protection of the roll (R') against shock and abrasion. Alternatively, skilled artisans will appreciate that only strips of cushioning material 112 (not shown) need be interposed along opposing transverse edges of a select stretchable segment between successive convolutions to provide protection of the roll against shock and abrasion.

Furthermore, in this embodiment, the first and second overlap portions 119,121 cooperate with each of the respective compressively sealed opaque end members 22 to form a labyrinth-type seal 124 on each of the annular faces 12,14 for resisting the ingress of light to the roll (R').

In yet another aspect of the present invention, an article of manufacture (FIGS. 3 and 8) comprises a web roll (R,R') and a light-tight and physically protected packaging 10,100, as previously described, enclosing the web roll (R,R'), as described.

To make the packaging 10 of the invention, the manufacturer would grasp the flexible material portion 24 attached to the leading end portion 18 of the roll (R) (FIG. 1). Noting that the flexible material portion 30 in its original relaxed state is wider than the roll (R) product, the manufacturer would then rotate the roll (R) to receive the flexible material portion 24. Accordingly, the flexible material portion 24 is stretched around the circumference of the roll (R) and over the end peripheral edges 16 (FIG. 2). This is done for at least one convolution. Opaque end members 22 are then applied to the core 21 of the roll (R). The outside diameter of the end member 22, as indicated, is smaller than the roll (R) but large enough to cover the folded over edge of the flexible material portion 24. Preferably, a center portion of the opaque end member 22 is attached by heat sealing to the interior wall of the core. The inventors experience indicates that a superior light tight seal results and the core opening 23 is not rendered unavailable for use.

Further, in FIGS. 5A and 5B the flexible material portion 24 is necked down to approximate the length w of the roll (R). As the roll (R) is rotated to receive material 24, the flexible material portion 24 is relaxed so as to approximate a width wider than the length w of the roll (R). The wider width material portion 24 therefore traps the outer edges of the end members 22 as the flexible material portion 24 conforms to the end peripheral edges 20 of the roll (R). At least one more convolution is applied to the roll (R), thereby forming a light protective package. If physical protection is not required, the flexible material portion 24 can be cut and held closed with tape or a label.

To integrally add physical protection and lighttight warnings in the packaging 10 of the invention, the flexible material portion 24 is allowed to relax again as the roll (R) is rotated to receive more of the flexible material 24. A layer 112 of cushioning material preferably slightly wider than the roll (R) is inserted and sandwiched between the successive convolutions of stretchable segments thus providing physical protection (see FIGS. 6, 7 and 9). After at least one revolution of cushioning layer 112 on the roll (R), the cushioning layer 112 is cut. The flexible material portion 24 is further stretched and then necked down to approximate a width less than or equal to the length w of the roll (R). Thereafter, the material 24 is cut and a label or other sealing device is attached to the outside of the roll (R) for sealing, thus completing the packaging 10. Alternatively, a lighttight indicator means (FIG. 7), preferably an adhesive strip 60, can be applied to at least one convolution after the outermost first convolution, as described above. If no cushioning material layer 112 is needed, the light-tight indicator means or adhesive strip 60 can become the sole means for closing the packaging 10. A similar method could be used for wider rolls (R) having a length w greater than 12 inches, as indicated above. The flexible material portion 24, in this embodiment, can now be narrower than the rolls (R). The flexible material portion 24, as described above, is detachably attached to the leading end portion 18 of the roll (R). As the roll (R) is rotated to receive the material 24, it is wrapped about the outermost convolution of the roll (R) by stretching from one end peripheral edge 20 to the over opposite end peripheral edge 16. This edge to edge wrapping of the flexible material 24 is repeated until the desired number of convolutions on the roll (R) is achieved.

As indicated above, opaque end members 22 are applied to the annular faces 12,14 in the same manner as described above for rolls (R) of narrower width, i.e., rolls having a width less than about 12 inches (30.48 cm). Wrapping the flexible material portion 24 from end to end alternatively traps the end members 22 against the respective annular face 12,14 thereby sealing the annular faces 12,14 of the roll (R), together with the labyrinth-type seal 42, protects the annular faces 12,14 of the roll (R) from the ingress of light (FIG. 5a). Moreover, the outermost first convolution 20 of the roll (R) is protected from light by the by the overlapping opaque flexible material portion 24 wrapped thereon.

The packaging 10 of the web roll (R) is then closed by a label or other fastening device (FIG. 8).

If desired, the core openings 23 (FIG. 3) can be closed by the application of labels on the end members 22 (not shown). The labels could be removed or perforated by the user to access the core opening. The same can be achieved by presizing and forming the end member 22 material inside the core while sealing a portion of the end member 22 on interior wall 25 of the core 21 or to core opening 23. Using the latter technique, the end member 22 portion inside the core 21 can then be punched out by the user or perforated so that a shaft (not shown) is allowed to be inserted in the core 21.

Those skilled artisans will appreciate that additional variations to this invention are possible. For instance, the opaque end members 22 can be part of the core 21 or made of the same material as the core 21 (not shown). Moreover, the flexible material portion 22 may be formed as part of the end member 22, if additional sealing is required around the labyrinth-type seal 42 described above. Further, the cushioning material layer 112 could comprise strips of material arranged along the edges of the roll (R), the primary target of impact such as shock and abrasion.

A suitable means 200 for wrapping the packaging 10,100 of the invention is illustrated in FIG. 11. According to FIG. 11, a supply of flexible material 24,102 can be fed from a roll ($R_f$) and be caused to selectively wrap around the product roll ($R_p$). Means 202 for cutting the material after the wrapping has been completed may be provided. Pre-stretch means, such as a plurality of rollers ($R_c$), engaging a transverse edge portion (not shown) of the flexible material 24 provides the sequential stretchable segments described above. Moreover, roller means ($R_l$) for providing various labels 60 and strips in select convolutions to the product roll ($R_p$) can also be provided on material 24,102 at position 60a. Take up rollers $R_t$ can be provided for relieving excess labeling material 60 being supplied to the packaging. As indicated above, a cushioning layer 112 (FIGS. 6–7) for imparting physical protection to the product roll ($R_p$) can be provided in an alternative embodiment of the invention during the wrapping process by, for example, a supply roller ($R_{s'}$). Other apparatus having features that may be adapted to making the packaging 10 of the invention, particularly for wide rolls, include the devices disclosed in U.S. Pat. Nos. 5,203,139, 1,870,399, 4,912,911, 4,909,880, 4,840,006.

The invention has therefore been described with reference to certain embodiments thereof, but it will be understood that variations and modifications can be effected within the scope of the invention.

| Parts List | |
|---|---|
| Packaging | 10,100 |
| Roll | R,R' |
| Annular faces of Roll | 12,14 |
| End Peripheral Edges | 16,118 |
| Leading end Portion | 18 |
| Outer First Convolution | 20,114 |
| opaque end member | 22 |
| Flexible material portion | 24,102 |
| Core | 21 |
| Core Opening | 23 |
| Interior Wall of Core | 25 |
| Core Plug | 26 |
| Tape Strip | 27 |
| First, Second & Third Stretchable Segments | 28,30,32 |
| First Overlap Portion | 36,119 |
| Second Overlap Portion | 40,121 |
| Labyrinth seal | 42,124 |
| Lighttight indicating means | 60 |
| First, Second, and Third Stretchable Segments | 104,106,108 |
| Cushioning material layer | 112 |

We claim:

1. Light-tight packaging for a roll of photosensitive web wound on a core, said roll having opposing annular faces and end peripheral edges surrounding said opposing annular faces, and a leading end portion extending from an outermost first convolution of said roll, said packaging comprising:

a pair of opaque end members, one attached to each end of said core, said opaque end members each being configured to cover a portion of a respective one of said annular faces;

an opaque flexible material portion detachably attached to said leading end portion of said roll, said flexible material portion having sequentially first, second and third stretchable segments, said first and third stretchable segments having a similar width ($w_1$) initially somewhat wider than the width ($w_2$) of said roll, and said second stretchable segment having a width ($w_3$) equal to or less than the width ($w_2$) of the roll (R);

said first stretchable segment of said flexible material portion being stretchably wrapped around said outermost first convolution of said roll to form an outermost second convolution, said first stretchable segment being wrapped to overhang said end peripheral edges and overlap a portion of said opposing annular faces of said roll thereby forming a first overlap portion on said annular face;

said second stretchable segment being wrapped around at least a portion of said outermost second convolution; and, said third stretchable segment being wrapped around said outermost second convolution to form an outermost third convolution, said third stretchable segment being wrapped to overhang said end peripheral edges and overlay said first overlap portion to form a second overlap portion on each annular face, said third stretchable segment further overlapping continuously at least a portion of each of said opaque end members, said second overlap of said third stretchable segment about each of said opaque end members being sufficient to compressively seal each of said opaque end members to a respective annular face of said roll; and, wherein said first and second overlap portions cooperate with said opaque end members to form a seal on each of said annular faces for resisting the ingress of light thereto.

2. The light-tight packaging recited in claim 1 wherein a tapered segment of the flexible material portion attaches to the leading end portion of the roll.

3. The light-tight packaging recited in claim 2 wherein a tape strip is provided for attaching the tapered segment to the leading end portion.

4. The light-tight packaging recited in claim 1 wherein light-tight indicator means attachable to said opaque flexible material is provided for indicating to a user that said roll is protected against light ingression.

5. The light-tight packaging recited in claim 4 wherein said light-tight indicator means comprises an adhesive layer attached to an end edge of said third stretchable segment.

6. The light-tight packaging recited in claim 1 wherein said flexible material portion is attached to a portion of the leading end portion of the roll.

7. The light-tight packaging recited in claim 1 wherein the flexible material portion comprises a low density polyethylene material.

8. The light-tight packaging recited in claim 1 wherein said opaque end member is a rubber modified high density polyethylene material.

9. The light-tight packaging recited in claim 1 wherein an adhesive label is provided on the outermost third convolution for sealing closed said roll and identifying the roll therein, said label being provided with means for graspably peeling said label from said outermost third convolution.

10. The light-tight packaging recited in claim 1 wherein said opaque end members are preformed from said core, a portion of said preformed members being extendible around a portion of said respective annular face of said roll.

11. The light-tight packaging recited in claim 10 wherein said opaque end members are sealed to the interior wall of said core.

12. Light-tight packaging for photosensitive web roll wound on a core, said core having opposing end openings surrounding an interior wall, said roll having opposing annular faces and end peripheral edges surrounding said opposing annular faces, and a leading end portion extending from an outermost first convolution of said roll, said packaging comprising:

a pair of opaque end members, one attached to each end of said core, said opaque end members each being configured to cover a portion of a respective one of said annular faces;

an opaque flexible material portion detachably attached to said leading end portion of said roll, said flexible material portion having sequentially first, second, and third stretchable segments, said first and third stretchable segments each having a similar width ($w_1$) initially somewhat wider than the width ($w_2$) of said roll, and said second stretchable segment having a width ($w_3$) equal to or less than the width ($w_2$) of the roll;

said first stretchable segment of said flexible material portion being stretchably wrapped around said outermost first convolution of said roll to form an outermost second convolution, said first stretchable segment being wrapped to overhang the end peripheral edges of said roll and overlap a portion of the opposing annular faces of the roll thereby forming a first overlap portion on each of the annular faces;

said second stretchable segment being wrapped around at least a portion of said outermost second convolution;

said third stretchable segment being wrapped around said outermost second convolution for at least two convolutions to form an outermost third and fourth convolution, said third stretchable segment being wrapped to overhang said end peripheral edges and overlay said end members attached to said core to form a second overlap portion, said third stretchable segment further overlapping continuously at least a portion of each of said opaque end members, said second overlap of said third stretchable segment about each of said opaque end members being sufficient to compressively seal each of said opaque end members to a respective annular face of said roll;

wherein said first and second overlap portions cooperate with each of said opaque end members to form a seal on each said annular face for resisting the ingress of light to said roll; and, wherein a cushioning layer is sandwiched between said third and fourth convolutions for protecting the roll from shock and abrasion.

13. The light-tight packaging recited in claim 12 wherein said cushioning layer comprises at least two cushioning portions arranged along opposing transverse edges of said third stretchable segment.

14. The light-tight packaging recited in claim 12 wherein light-tight indicator means attached to said opaque flexible material is provided for indicating to a user that said roll is protected against light ingression.

15. The light-tight packaging recited in claim 12 wherein the flexible material portion is a low density polyethylene material.

16. The light-tight packaging recited in claim 12 wherein said opaque end member is a rubber modified high density polyethylene material.

17. The light tight packaging recited in claim 12 wherein said cushioning layer comprises an expandable plastic foam material.

18. The light-tight packaging recited in claim 12 wherein an adhesive label is provided on the outermost fourth convolution for sealing closed said roll and identifying the roll therein.

19. The light-tight packaging recited in claim 12 wherein one of said second, third or fourth convolutions comprises said cushioning layer.

20. The light-tight packaging recited in claim 12 wherein said cushioning layer comprises an expandable plastic foam material.

21. An article of manufacture, comprising:

a web roll having opposing annular faces, and end peripheral edges surrounding said annular faces;

light-tight packaging enclosing said web roll, said light-tight packaging comprising:

a pair of opaque end members, one attached to each end of said core, said opaque end members each being configured to cover a portion of a respective one of said annular faces;

an opaque flexible material portion detachably attached to a leading end portion of said roll, said flexible material portion having sequentially first, second and third stretchable segments, said first and third stretchable segments each having a similar width ($w_1$) initially somewhat wider than the width ($w_2$) of said roll, and said second stretchable segment having a width ($w_3$) equal to or less than the width ($w_2$) of the roll;

said first stretchable segment of said flexible material portion being stretchably wrapped around an outermost first convolution of said roll to form an outermost second convolution, said first stretchable segment being wrapped to overhang said end peripheral edges and overlap a portion of said opposing annular faces of said roll thereby forming a first overlap portion on said annular face;

said second stretchable segment being wrapped around at least a portion of said outermost second convolution; and, said third stretchable segment being wrapped around said outermost second convolution to form an outermost third convolution, said third stretchable segment being wrapped to overhang said end peripheral edges and overlay said first overlap portion to form a second overlap portion, said third stretchable segment further overlapping continuously at least a portion of said opaque end members, said second overlap of said third stretchable segment about each of said opaque end members being sufficient to compressively seal each of said opaque end members to a respective annular face of said roll; and wherein said first and second overlap portions cooperate with each of said opaque end members to form a seal on each of said respective annular face for resisting the ingress of light thereto.

22. The article of manufacture recited in claim 21 wherein a cushioning layer is provided in any one of said second or third convolutions for protecting the roll from shock and abrasions.

23. The article of manufacture recited in claim 21 wherein light-tight indicator means attached to said opaque flexible material portion is provided for indicating to a user that said roll is protected against the ingression of light.

24. The article of manufacture recited in claim 23 wherein said light-tight indicator means is an adhesive strip.

\* \* \* \* \*